United States Patent
Clune et al.

(10) Patent No.: US 7,641,469 B2
(45) Date of Patent: *Jan. 5, 2010

(54) FASTENER MOLDING

(75) Inventors: William P. Clune, Hillsboro, NH (US); Mark A. Clarner, Concord, NH (US); Christopher M. Gallant, Nottingham, NH (US); James W. Babineau, Austin, TX (US)

(73) Assignee: Velcro Industries B.V., Curacao (NL)

( * ) Notice: Subject to any disclaimer, the term of this patent is extended or adjusted under 35 U.S.C. 154(b) by 366 days.

This patent is subject to a terminal disclaimer.

(21) Appl. No.: 11/740,097

(22) Filed: Apr. 25, 2007

(65) Prior Publication Data

US 2007/0190194 A1 Aug. 16, 2007

Related U.S. Application Data

(60) Continuation-in-part of application No. 11/546,821, filed on Oct. 12, 2006, now abandoned, which is a division of application No. 10/952,104, filed on Sep. 28, 2004, now Pat. No. 7,192,266, application No. 11/740,097, which is a continuation-in-part of application No. 11/131,780, filed on May 18, 2005, now Pat. No. 7,217,119.

(51) Int. Cl.
B29C 43/46 (2006.01)
(52) U.S. Cl. ...................... 425/471; 425/363
(58) Field of Classification Search ............... 425/115, 425/363, 471
See application file for complete search history.

(56) References Cited

U.S. PATENT DOCUMENTS

| | | | |
|---|---|---|---|
| 3,312,583 A | 4/1967 | Rochlis | |
| 3,507,010 A | 4/1970 | Doleman et al. | |
| 3,590,109 A | 6/1971 | Doleman et al. | |
| 3,752,619 A | 8/1973 | Menzin et al. | |
| 3,762,000 A | 10/1973 | Menzin et al. | |
| 4,080,148 A * | 3/1978 | Wise | 425/576 |
| 4,383,670 A | 5/1983 | Olschewski et al. | |
| 4,775,310 A | 10/1988 | Fischer | |
| 4,794,028 A | 12/1988 | Fischer | |
| 4,828,778 A * | 5/1989 | Gelsomini et al. | 264/167 |
| 5,167,895 A | 12/1992 | Lueghamer et al. | |
| 5,800,845 A | 9/1998 | Akeno et al. | |
| 5,875,527 A | 3/1999 | Lacey et al. | |
| 5,900,350 A | 5/1999 | Dowd et al. | |
| 5,922,222 A | 7/1999 | Jens et al. | |
| 5,971,738 A | 10/1999 | Jens et al. | |
| 5,980,230 A | 11/1999 | Buzzell et al. | |

(Continued)

FOREIGN PATENT DOCUMENTS

EP 1042971 A1 11/2000

OTHER PUBLICATIONS

European Search Report (05021168.9), mailed Dec. 23, 2005.

(Continued)

*Primary Examiner*—James Mackey
(74) *Attorney, Agent, or Firm*—Fish & Richardson P.C.

(57) ABSTRACT

The invention relates to fastener molding. In one aspect, a molding apparatus includes a cylindrical member defining a void extending radially inward from a peripheral surface of the member. The molding apparatus also includes an insert member configured to be disposed within the void.

34 Claims, 13 Drawing Sheets

U.S. PATENT DOCUMENTS

| | | |
|---|---|---|
| 6,039,556 A | 3/2000 | Jens et al. |
| 6,099,289 A | 8/2000 | Jens et al. |
| 6,162,040 A | 12/2000 | Clune |
| 6,163,939 A | 12/2000 | Lacey et al. |
| 6,202,260 B1 | 3/2001 | Clune et al. |
| 6,258,311 B1 | 7/2001 | Jens et al. |
| 6,280,670 B1 | 8/2001 | Buzzell et al. |
| 6,287,665 B1 | 9/2001 | Hammer |
| 6,432,339 B1 | 8/2002 | Jens et al. |
| 6,533,981 B1 | 3/2003 | Jens et al. |
| 6,640,348 B1 | 11/2003 | Provost et al. |
| 6,902,389 B2 | 6/2005 | Gorman et al. |
| 7,029,265 B2 | 4/2006 | Plammer |
| 7,192,266 B2 * | 3/2007 | Gallant et al. ............ 425/363 |
| 7,217,119 B2 * | 5/2007 | Clune et al. ............ 425/471 |
| 2001/0000117 A1 | 4/2001 | Gorman et al. |
| 2002/0022108 A1 | 2/2002 | Krantz et al. |
| 2002/0190418 A1 | 12/2002 | Jens et al. |
| 2003/0012921 A1 | 1/2003 | Gallant et al. |
| 2003/0034583 A1 | 2/2003 | Provost |

OTHER PUBLICATIONS

Search Report and Written Opinion; mailed Sep. 9, 2006; PCT/US2006/019199.

\* cited by examiner

FASTENER MOLDING

CROSS-REFERENCE TO RELATED APPLICATIONS

This application is a continuation-in-part application of U.S. application Ser. No. 11/131,780, filed on May 18, 2005, now U.S. Pat. No. 7,217,119. This application is also a continuation-in-part application of U.S. application Ser. No. 11/546,821, filed on Oct. 12, 2006, now abandoned, which is a divisional of U.S. application Ser. No. 10/952,104, filed Sep. 28, 2004, now U.S. Pat. No. 7,192,266. Each of the applications noted above is incorporated by reference herein.

TECHNICAL FIELD

This invention relates to fastener molding.

BACKGROUND

Fastener products, such as hook components of hook-and-loop fasteners, or other projections for releasable engagement into a cooperating material, can be manufactured by a continuous molding method employing a mold roll that has fastener-shaped mold cavities formed in its periphery. In operation, molten polymer from an extruder can be introduced into a pressure nip to force the molten polymer under high pressure into the fastener cavities of the mold roll to mold fastener elements (e.g., hooks or stems). At the same time, the mold roll can form a sheet-form base from which the fastener elements extend.

SUMMARY

In one aspect, a molding apparatus includes a cylindrical member (e.g., a ring, a disk, a sleeve, etc.) defining a void extending radially inward from a peripheral surface of the cylindrical member. The molding apparatus also includes an insert configured to be disposed within the void. The insert and the cylindrical member cooperate to define a molding cavity when the insert is disposed within the void. The molding cavity is shaped to mold, from molten resin introduced into the molding cavity, a fastener element for releasable engagement with a mating fastener product.

In another aspect, a molding apparatus includes a cylindrical member (e.g., a ring, a disk, a sleeve, etc.) defining a void extending radially inward from a peripheral surface of the cylindrical member. The molding apparatus also includes an insert configured to be disposed within the void. The insert and the cylindrical member cooperate to define a molding cavity when the insert is disposed within the void. The molding cavity is shaped to mold an element from molten resin introduced into the molding cavity.

In a further aspect of the invention, a molding device includes a cylindrical member defining a void extending radially inward from a peripheral surface of the cylindrical member, and insert configured to be disposed within the void of the cylindrical member, and an end cap configured to be coupled to the cylindrical member. The insert includes a body portion and at least one laterally extending portion that extends laterally from the body portion, and the end cap defines a groove extending laterally from a side surface of the end cap. The groove is arranged to receive the laterally extending portion of the insert such that the insert is restrained within the groove of the end cap when the insert is disposed within the void of the cylindrical member and the end cap is coupled to the cylindrical member.

In an additional aspect, the invention features a method of making a molding apparatus, which includes forming a groove in a side surface of a first ring. The groove extends inwardly from the side surface of the ring and from a circumferential surface of the ring. The method further includes removing material from circumferentially spaced apart regions of the first ring to form voids that extend inwardly from the circumferential surface of the ring. The regions from which the material is removed extend from at least a top region of the groove to a bottom region of the groove such that a portion of the groove extends through portions of the ring between the circumferentially spaced apart voids, such that each of the ring portions between the voids defines a recessed region. The method also includes disposing insert members within the voids of the ring. The insert members and the portions of the ring between the voids cooperate to define molding cavities.

In a further aspect, the invention features a method of producing a fastener product having a multiplicity of fastener elements extending from a base, which includes providing a rotating mold roll including a plurality of first rings arranged in a stack. Each of the first rings defines multiple voids that extend inwardly from a circumferential surface of the roll. The voids are circumferentially spaced apart from one another by portions of the ring that include recessed regions that partially define molding cavities. The mold roll also includes multiple insert members disposed within the voids. The insert members cooperate with the portions of the ring between the voids to define the molding cavities. The method further includes introducing molten resin to a circumferential surface of the roll and forcing some of the resin into the molding cavities under pressure, thereby molding an array of fastener elements integrally with resin disposed at the circumferential surface of the molding apparatus. The method then includes stripping the resin from the mold roll to expose the multiple fastener elements extending from the base.

Embodiments can include one or more of the following features.

In some embodiments, the molding cavity is shaped to mold a fastener element including a stem and a feature extending radially from the stem in at least one direction.

In some embodiments, the molding cavity is shaped to mold a fastener element having a crook portion.

In some embodiments, the insert can be oriented in the void to mold a fastener element having a crook portion that extends in a direction across a width of the cylindrical member.

In some embodiments, a first molding cavity is shaped to mold a first fastener element in a first direction and a second molding cavity is shaped to mold a second fastener element in a second direction.

In some embodiments, the insert is configured to be positioned within the void in any of a plurality of orientations.

In some embodiments, the insert is removable from the void.

In some embodiments, the insert and the void having mating geometries.

In some embodiments, the insert is press-fitted within the void.

In some embodiments, the cylindrical member is a ring.

In some embodiments, the insert extends from a surface of a ring, and the insert is disposed within the void when the ring is positioned adjacent and concentric with the cylindrical member.

In some embodiments, the apparatus includes multiple cylindrical members and rings arranged adjacent to one another in an alternating pattern.

In some embodiments, the multiple cylindrical members and rings are positioned about an inner member and axially compressed to form a substantially cylindrical molding roll.

In some embodiments, the molding extends from a first side of the insert to a second side of the insert.

In some embodiments, the cylindrical member includes a sleeve that has an inner surface, and the void extends from the inner surface to the peripheral surface of the sleeve.

In some embodiments, the apparatus further includes a plurality of spaced apart voids and a plurality of inserts configured to be disposed within the voids.

In some embodiments, portions of the cylindrical member define the molding cavity.

In some embodiments, the insert can be oriented in the void such that a portion of the element overhanging a base of a product molded by the molding apparatus extends in a direction across the width of the cylindrical member.

In some embodiments, the void extends along the peripheral surface of the cylindrical member in a direction substantially parallel to the axis of rotation of the cylindrical member.

In some embodiments, the void extends from a first side of the cylindrical member to a second side of the cylindrical member.

In some embodiments, the molding cavity is completely defined within the insert.

In some embodiments, a portion of the cylindrical member defining the void comprises a recess that, together with the insert, defines the molding cavity.

In some embodiments, the portion of the cylindrical member defining the void, together with a recessed portion of the insert, defines the molding cavity.

In some embodiments, a first molding cavity is defined between a first side of the insert and the cylindrical member.

In some embodiments, a second molding cavity is defined between a second side of the insert and the cylindrical member.

In some embodiments, the molding cavity is defined by perimeter portions of the insert and the sleeve.

In some embodiments, the insert includes a first portion and a second portion. The first portion of the insert is positioned within a first portion of the void, and the second portion of the insert is positioned within a second portion of the void.

In some embodiments, the insert is configured to be positioned within the void in any of a plurality of orientations.

In some embodiments, forming the groove in the side surface of the ring involves machining the side surface of the ring.

In some embodiments, removing the material from circumferentially spaced apart regions of the ring includes wire electrical discharge machining the circumferentially spaced apart regions of the ring.

In some embodiments, the groove, prior to removing the material from the circumferentially spaced apart regions of the first ring, extends substantially continuously around the ring.

In some embodiments, at least some of the insert members each partially define two molding cavities.

In some embodiments, the method further includes disposing a second ring adjacent the first ring. The second ring cooperates with side surfaces of the insert members to define at least some of the molding cavities. In some embodiments, the method further includes arranging multiple such first and second rings adjacent one another in an alternating pattern.

In some embodiments, disposing the insert members within the voids involves press-fitting the insert members within the voids.

In some embodiments, at least some of the insert members extend from a side surface of a second ring adjacent the first ring.

In some embodiments, at least some of the molding cavities are shaped to mold fastener elements having crook portions.

In some embodiments, the method further includes disposing a second ring adjacent the first ring. The second ring defines multiple voids extending inwardly from a circumferential surface of the ring. The voids are circumferentially spaced apart from one another by portions of the ring that include recessed regions that partially define molding cavities.

In some embodiments, the method further includes aligning the recessed regions of the first and second rings such that the recessed regions of the first and second rings cooperate to define molding cavities.

In some embodiments, aligning the recessed regions of the first and second regions includes aligning features of the first and second rings with an alignment feature on a mandrel as the rings are positioned about the mandrel.

In some embodiments, the insert members are disposed within the voids by arranging second rings between adjacent first rings. The insert members extend from side surfaces of the second rings.

In some embodiments, the insert members are disposed within the voids by press-fitting the insert members into the voids.

In some embodiments, the cylindrical member defines a plurality of circumferentially spaced apart voids extending radially inward from the peripheral surface of the cylindrical member and a plurality of inserts configured to be disposed within the plurality of voids.

In some embodiments, the insert and the cylindrical member cooperate to define at least one molding cavity when the insert is disposed within the void of the cylindrical member.

In some embodiments, the at least one molding cavity includes a crook portion that extends in a lateral direction across the cylindrical member.

In some embodiments, the groove is an annular groove.

In some embodiments, the laterally extending portion of the insert is tapered.

In some embodiments, the laterally extending portion of the insert and the groove have mating geometries.

In some embodiments, the resin is introduced into a nip defined by the molding apparatus and an adjacent pressure device.

In some embodiments, the pressure device includes a counter-rotating pressure roll.

In some embodiments, each of the fastener elements includes an engageable head overhanging the base.

In some embodiments, the fastener elements include hooks.

In some embodiments, at least some of the fastener elements each have a loop-engageable crook extending laterally across the base.

Embodiments can include one or more of the following advantages.

In some embodiments, the insert is arranged within the void to produce a molded feature (e.g., a molded crook) that extends in the cross-machine direction (i.e., in a direction transverse to the cylindrical member). This arrangement can permit rapid and economical production of products (e.g., fastener products) having features (e.g., molded crooks) extending in a cross-machine direction.

In some embodiments, the insert may be oriented in any of various different radial directions within the void. The inserts can be arranged to produce non-directional fastener products (e.g., products that provide peel and shear resistance in substantially every direction along the base of the product).

In some embodiments, the inserts can be removed from the apertures, which allows for easy cleaning, repair, and replacement of inserts.

Other aspects, features, and advantages are in the description, drawings, and claims.

DETAILED DESCRIPTION

Figure 1:
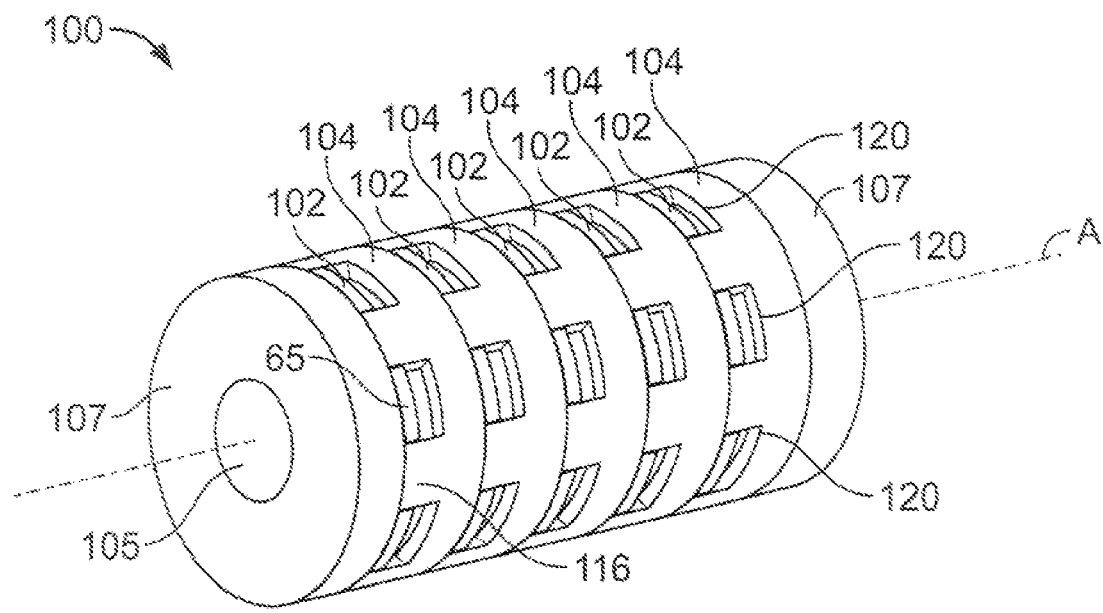
FIG. 1 is a perspective view of a molding device.

Referring to FIG. 1, a mold roll 100 includes multiple female rings 102 and multiple male rings 104 disposed about a mandrel 105. Female and male rings 102 and 104 are axially compressed between end rings 107. Male and female rings 102 and 104, as described below, cooperate to define multiple fastener-shaped (e.g., hook-shaped) molding cavities 120. Consequently, mold roll 100 can be used to mold fastener products that include multiple fastener elements (e.g., hook-shaped fastener elements). For example, as described in more detail below, molten polymer resin can be introduced at high pressure to the peripheral surface of mold roll 100 so that some of the molten resin enters molding cavities 120 to mold fastener elements, while the remaining portion of the molten resin is pressed against the peripheral surface of mold roll 100 to form a resin base from which the molded fastener elements extend.

Figure 2:
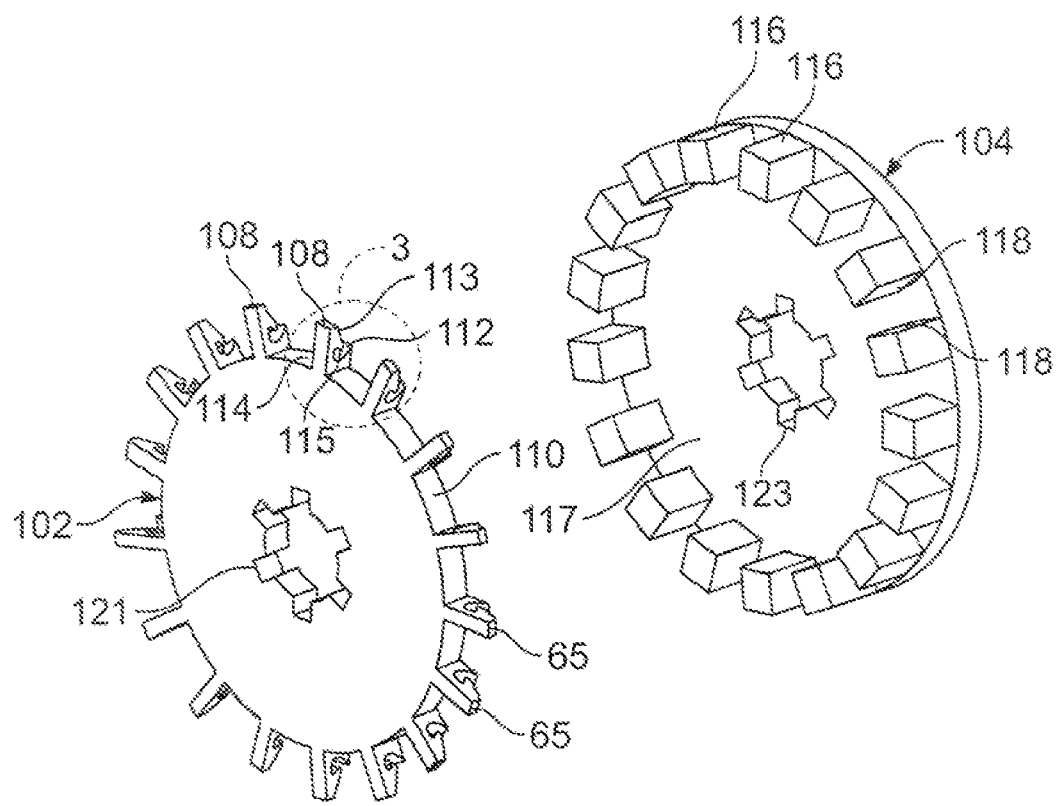
FIG. 2 is a partial exploded view of the molding device of FIG. 1.
Figure 3:
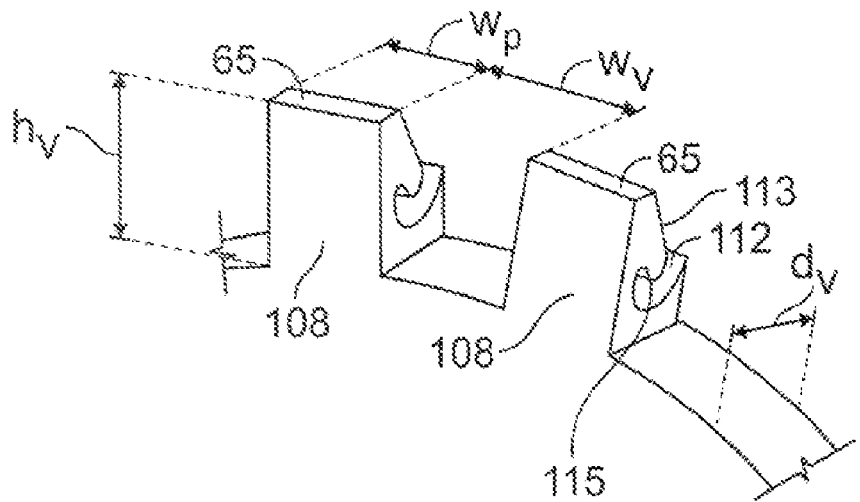
FIG. 3 is an enlarged view of region 3 in FIG. 2.

FIG. 2 shows an exploded view of a portion of molding device 100, which includes one of female rings 102 and one of male rings 104. Female ring 102 includes multiple, circumferentially spaced apart voids 114 that extend radially inward from a peripheral surface 65 of the ring. Peripheral surface 65 of female ring 102 (e.g., of portions 108 of female ring 102) helps to define the outer surface of mold roll 100, when assembled. Circumferentially spaced apart portions 108 of female ring 102 define voids 114. Referring to FIG. 3, portions 108 of female ring 102 have a width $w_p$ ranging from about 0.1 millimeter to about 1.3 millimeters (e.g., about 0.25 millimeter to about 0.6 millimeter). Portions 108 of female ring 102 include recessed regions 112 that span the width of portions 108, and are shaped to partially define molding cavities 120. Recessed regions 112 include stem portions 113 and crook portions 115, which can mold stem and crook portions, respectively, of hook-shaped fastener elements. Portions 108 can be spaced apart about the circumference of female ring 102 by a distance of about 0.15 millimeter to about one millimeter (e.g., about 0.25 millimeter to about 0.5 millimeter). In some embodiments, voids 114 are substantially uniformly spaced apart along the circumference of female ring 102. However, voids 114 can alternatively or additionally be spaced apart by non-uniform distances.

As shown in FIGS. 2 and 3, voids 114 extend from one side of female ring 102 to an opposite side of female ring 102. In certain embodiments, voids 114 are narrow relative to the diameter of mold roll 100. For example, voids 114 can have a width $w_v$ of about 0.15 millimeter to about one millimeter (e.g., about 0.25 millimeter to about 0.5 millimeter). Voids 114 generally have a height $h_v$ and a depth $d_v$ that are slightly greater (e.g., about 0.01 millimeter to about 0.04 millimeter greater) than the height and depth of recessed regions 112. Height $h_v$ of voids 114 can range from about 0.2 millimeter to about 1.3 millimeters (e.g., about 0.4 millimeter to about 0.9 millimeter) and depth $d_v$ of voids 114 can range from about 0.3 millimeters to about six millimeters (e.g., about 0.5 millimeter to about 2.5 millimeters).

Male ring 104, as shown in FIG. 2, includes multiple circumferentially spaced apart inserts 116 extending from a side surface 117 of the ring. The dimensions of inserts 116 generally roughly correspond to the dimensions of voids 114. In certain embodiments, the spaces between inserts 116 and the surfaces defining voids 114 (e.g., the side surfaces of portions 108), when inserts 116 are retained within voids 114, as described below, are sufficiently small to prevent resin from entering those spaces during the molding process. In some embodiments, the width, height, and/or depth of inserts 116 are slightly less (e.g., about 0.01 millimeter to about 0.04 millimeter less) than width $w_v$, height $h_v$, and/or depth $d_v$ of voids 114. Inserts 116 can, for example, have a height of about 0.16 millimeter to about 1.3 millimeter, a width of about 0.11 millimeters to about one millimeter, and/or a depth of about 0.26 millimeter to about 1.4 millimeter.

When mold roll 100 is assembled, as shown in FIG. 1, inserts 116 of male ring 104 are disposed (e.g., retained) within voids 114 of female ring 102. The top surfaces of inserts 116 are generally substantially aligned with peripheral surface 65 of female ring 102 when disposed within voids 114. This can, for example, allow mold roll 102 to form a fastener product having a substantially flat or uniform base from which fastener elements extend. The other surfaces of inserts 116 can similarly mate with corresponding surfaces of voids 114. Inserts 116 and voids 114 can, for example, have mating geometries such that inserts 116 can be disposed within voids 114 without substantial space between the surfaces of inserts 116 and the surfaces of female ring 102 that define voids 114. This can, for example, help to ensure that, during use of mold roll 100, molten resin is introduced substantially only into molding cavities 120.

Any of various suitable techniques can be used to retain inserts 116 within voids 114. In certain embodiments, as noted above, female and male rings 102 and 104 are stacked about mandrel 105 and axially compressed between end rings 107. The inner diameters of rings 102 and 104 can include slots 121 and 123 that mate with projections extending from the outer diameter of mandrel 105 to help align inserts 116 with voids 114. The axial compression of rings 102 and 104 can help to axially retain inserts 116 within voids 114, and contact between the outer diameter of mandrel 105 and the inner diameters of rings 102 and 104 can help to radially retain inserts 116 within voids 114.

Inserts 116 can have substantially flat side surfaces 118 (e.g., side surfaces with no recessed regions) that extend in a direction parallel to the axis of rotation A of mold roll 100. Consequently, when male ring 104 is mated with female ring 102 (e.g., when inserts 116 are retained within voids 114), side surfaces 118 of inserts 116 and side surface 117 of ring 104 can cooperate with voids 114 and portions 108 of ring 102 to define molding cavities 120 (FIG. 1) having substantially flat sides. In some embodiments, the side surfaces of inserts 116 extend substantially perpendicularly to peripheral surface 65 of ring 102. In certain embodiments, side surfaces 118 extend in a direction substantially perpendicular from the peripheral surface 65 of ring 104. In such embodiments, mold roll 100 can be used to form fastener elements that extend substantially perpendicularly from a resin base. In certain embodiments, the side surfaces of inserts 116 extend at an acute angle relative to the circumferential surface of ring 104. In such embodiments, mold roll 100 can be used to mold fastener elements with sides that extend at an acute angle relative to a resin base. The fastener elements can, for example, have sides that taper outwardly to form a lower base region that is wider than the upper crook portion.

Figure 5:
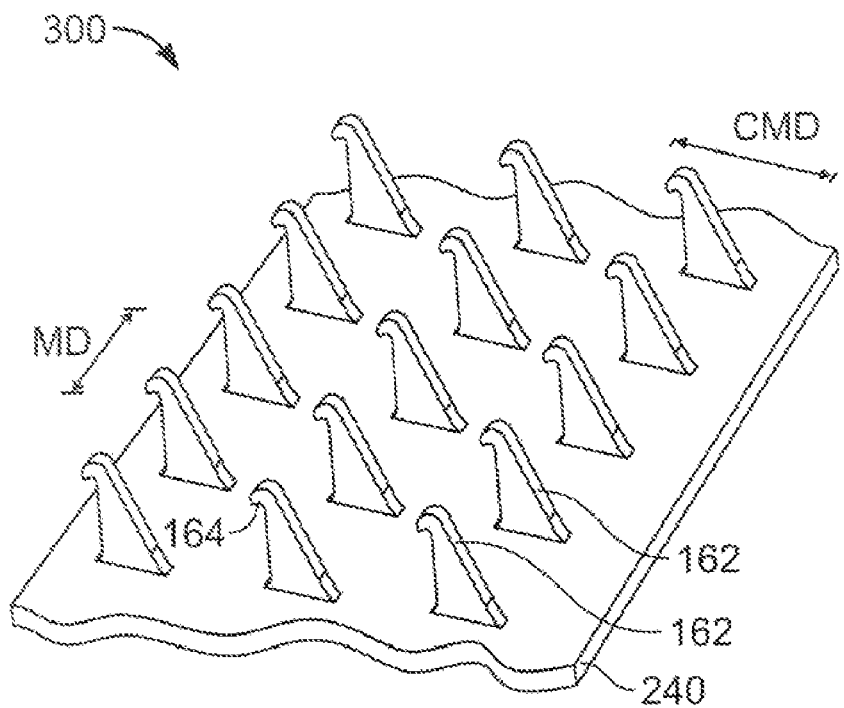
FIG. 5 is a perspective view of a fastener product molded using the method and apparatus of FIG. 4.

The crook portions of molding cavities 120 are aligned in a transverse direction of mold roll 100 (e.g., in a transverse direction of rings 102 and 104). This allows for molding of fastener elements 162 having crook portions extending (e.g., from rear to front) in a cross-machine direction CMD (i.e., transverse to mold roll 100 and perpendicular to the machine direction MD), as shown in FIG. 5. Such orientation can be useful for resisting loads applied to the fastener product in the cross-machine direction, such as when the fastener product (e.g., fastener tape) is secured across a diaper tab.

Molding cavities 120 are arranged such that all of crook portions 140 extend in the same direction. As a result, the fastener elements formed in molding cavities 120 include crook portions 164 extending in the same direction. This type of fastener product provides very little peel and shear resistance in one direction and a great deal of peel and shear resistance in the opposite direction. Molding cavities 120 can alternatively or additionally be arranged such that crook portions face in differing directions. For example, many (e.g., half) of the crook portions can face in opposite directions to mold a fastener product that can, for example, provide substantially equal peel and shear resistance in opposite directions.

A method of making mold roll 100 generally includes forming female rings 102 and male rings 104, and then assembling female rings 102 and male rings 104 about mandrel 105, as described above. Forming each of female rings 102 includes providing a ring having a substantially uniform thickness, and machining a hook-shaped groove in a side surface of the ring. The groove extends inwardly from a circumferential surface of the ring. A crook portion of the hook-shaped groove generally extends in a transverse direction of the ring (e.g., across a portion of the thickness of the ring). In certain embodiments, the groove extends continuously (e.g., uninterruptedly) around the circumference of the ring. Any of various machining techniques can be used to form the groove. In certain embodiments, the groove is formed using a lathe. The groove can alternatively or additionally be created using any of various other techniques, such as, milling, laser etching, and/or photo etching techniques.

After forming the groove in the side surface of the ring, material can be removed from the ring to form voids 114 and portions 108. Material can, for example, be removed from the circumferential surface of the ring inwardly to a region below the lowermost portion of the groove (e.g., below the crook portion of the groove). Voids 114 can have a width and depth such that substantially the entire cross-sectional area of the groove extending through portions 108 is exposed at voids 114. Voids 114 can be created within rings using any of various suitable material removal techniques. Examples of such techniques include wire EDM, plunge EDM, micro machining, laser cutting, and photo etching.

Male ring 104 can be formed by providing a ring of substantially uniform thickness, and removing material from a side surface of the ring to form inserts 116 extending from the side surface of the ring. For example, material can be removed from substantially all portions of the side surface except those regions where inserts 116 are desired. Any of various material removal techniques can be used to remove material from the ring. Examples, of such techniques include wire EDM, plunge EDM, micro machining, laser cutting, photo etching, and chemical etching. As an alternative to or in addition to the process described above for forming male ring 104, preformed inserts can be attached to a side surface of the substantially uniform ring to form male ring 104. The preformed inserts can, for example, be formed using any of various molding, casting, or machining techniques prior to being attached to the ring. The preformed inserts can be attached to the side of the ring using any of various suitable techniques, such as welding, bonding, and/or adhesive attachment techniques. Alternatively or additionally, material can be applied to the side surface of ring 104 using any of various techniques, such as electroplating techniques, to form inserts 116.

After forming female and male rings 102 and 104, the rings are stacked about mandrel 105 such that inserts 116 mate with voids 114 to define molding cavities 120. Female and male rings 102 and 104 are then axially compressed between end rings 107. The axial compression force can help to ensure that inserts 116 are securely retained within voids 114.

Figure 4:
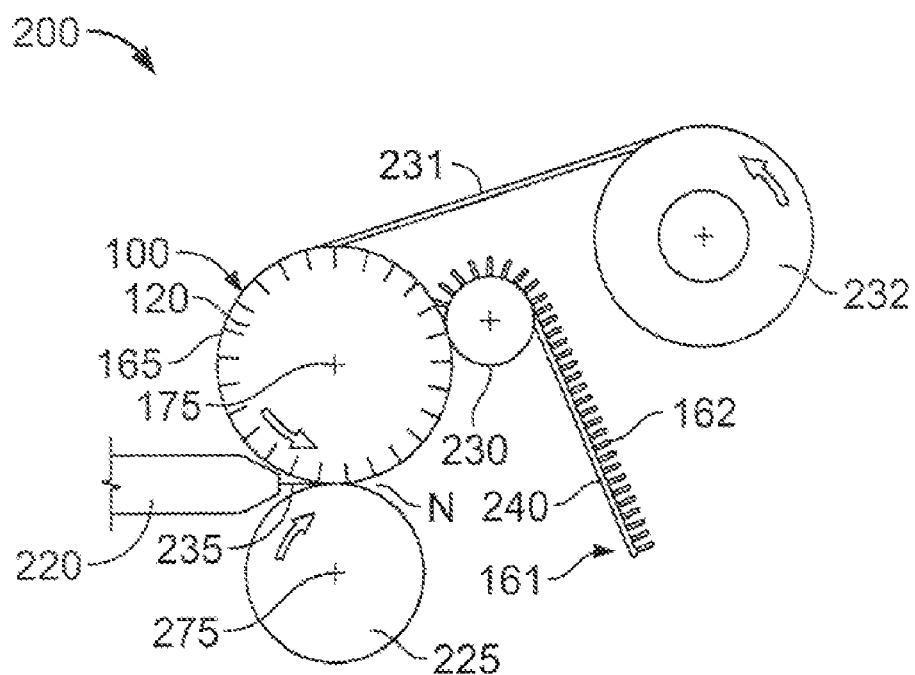
FIG. 4 illustrates a method and apparatus for forming fastener products.

Referring to FIG. 4, an apparatus 200 for making fastener products includes mold roll 100, an extruder 220, a pressure roll 225, a stripping roll 230, and a sheet-form material 231. During use, sheet-form material 231 is held in tension between a roll 232 of sheet-from material 231, mold roll 100, and stripping roll 230. Sheet-form material 231 may be comprised of one or more of several suitable materials. For example, sheet-form material 231 may be a loop material, a non-woven fabric, a reinforcing scrim, a porous material, paper, or foam.

Mold roll 100 is positioned adjacent pressure roll 225 such that their axes of rotation 175 and 275 are substantially parallel to one another. A nip N is created between circumferential surface 165 of molding device 100 and an adjacent surface of pressure roll 225. Molding device 100 and pressure roll 225 rotate counter to one another, which creates a large amount of pressure within nip N.

Extruder 220 extrudes a molten resin 235 into nip N where it meets sheet-form material 231. Molten resin 235 may comprise one or more of various thermoplastics and other resins. A high density polyethylene, such as Exxon Mobil #6908, can be used for some applications. Other suitable materials include low density polyethylene (LDPE), polypropylene, and nylon, for example.

As sheet-form material 231 and molten resin 235 are conveyed through nip N, the high nip pressure forces some of the molten resin 235 into molding cavities 120 to mold an array of fastener elements, while the remainder of molten resin 235 is compressed between circumferential surface 165 of mold roll 100 and an adjacent surface of pressure roll 225 to form a resin base 240 from which fastener elements 162 extend. The high nip pressure can also bond resin base 240 to sheet-form material 231. Alternatively or additionally, other suitable attachment methods may be used to attach resin base 240 to sheet-form material 231. For example, a heat-sensitive adhesive may be applied to one side of sheet-form material 231 and heat may be applied, at a later time, to resin base 240 and/or sheet-form material 231 in order to adhesively bond resin base 240 to sheet-form material 231.

After molten resin 235 has been introduced (e.g., forced) into molding cavities 120, the resin is allowed to cool and harden within molding cavities 120. Mold roll 100 and pressure roll 225 may be internally cooled by liquid (e.g., water) to facilitate the cooling of molten resin 235. After cooling and hardening, resin 235 has a shape permanently corresponding to the shape of molding cavities 120. For example, molten resin 235 can be in the shape of fastener hooks.

Sheet-form material 231 and the resin carried thereon are then conveyed along mold roll 100 toward stripping roll 230. Sheet-form material 231 and the resin thereon are conveyed around stripping roll 230, causing some of fastener elements 162, which have been allowed to cool and harden, to be stripped from molding cavities 120. At this point, a fastener product sheet 161 having an array of fastener elements 162 extending from resin base 240 is exposed. Fastener product sheet 161 can then be separated (e.g., cut, slit, and/or punched) to form multiple discrete fastener products 300 (FIG. 5).

As shown in FIG. 5, the resulting fastener product 300 includes multiple rows of fastener elements 162 integrally extending from resin base 240. Crook portions 164 of fastener elements 162 can be designed to engage with corresponding fastener elements (not shown) in order to provide peel and shear resistance. The corresponding fastener elements may be comprised of any material susceptible to engagement with crook portions 164, such as loop material and/or non-woven fabric.

Figure 6:
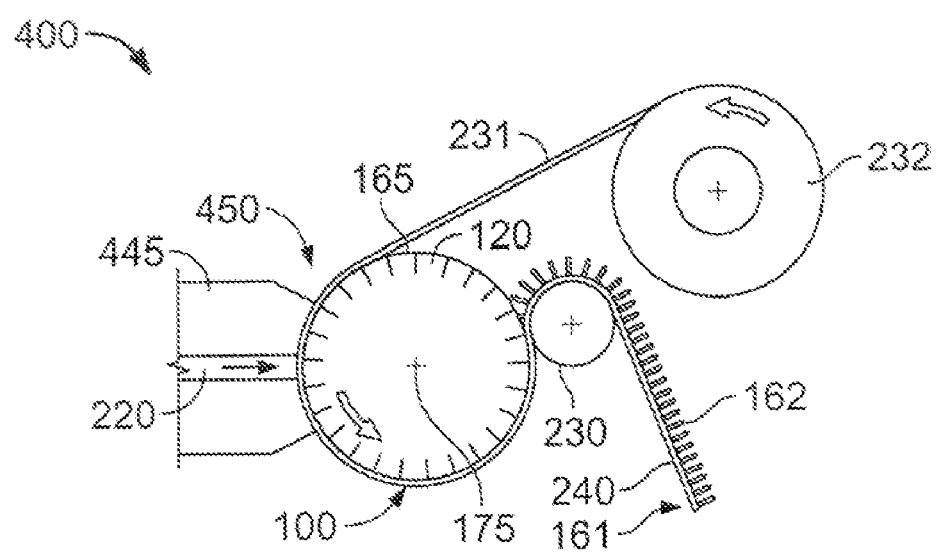
FIG. 6 illustrates another method and apparatus for forming fastener products.

Referring to FIG. 6, an alternative apparatus 400 for producing fastener product 300 includes molding device 100, extruder 220, and extruder housing 445, stripping roll 230, and sheet-form material 231. Extruder housing 445 is disposed around extruder 220. Extruder housing 445 is arcuate-shaped to define a predetermined gap 450 between extruder housing 445 and circumferential surface 165 of mold roll 100. Molten resin 235 is extruded through extruder 220 and into gap 450.

In this embodiment, sheet-form material 231 is preferably a porous material. As sheet-form material 231 is conveyed around molding device 100, extruder 220 forces molten resin 235 both onto and through sheet-form material 231. Due to the porosity of sheet-form material 231, some of resin 235 passes through sheet-form material 231 and into molding cavities 120 to form fastener elements 162, while the remainder of resin 235 adheres to sheet-form material 231 to form resin base 240 from which fastener elements 162 extend. Molten resin 235 is allowed to cool and harden before being stripped out of molding cavities 120 by stripping roll 230 to expose a newly formed fastener product sheet 161 having fastener elements 162 extending from resin base 240. The fastener product sheet 161 can then be cut to form discrete fastener products similar to fastener product 300 shown in FIG. 5.

While certain embodiments have been described above, other embodiments are possible.

As an example, in some embodiments, inserts 116 include recessed regions that partially define molding cavities 120. For example, side surfaces of inserts 116 can include recessed regions that align with recessed regions 112 of portions 108 when the inserts are positioned within voids 114. The recessed regions of inserts 116 can cooperate with recessed regions 112 of portions 108 to define molding cavities 120.

As another example, while the molding cavities and fastener elements of the embodiments above have been described as being J-hook-shaped, the molding cavities and fastener elements can alternatively or additionally be any of various other shapes. The molding cavities can, for example, be shaped to mold palm tree-shaped fastener elements, mushroom-shaped fastener elements, and/or stems.

Figure 7:
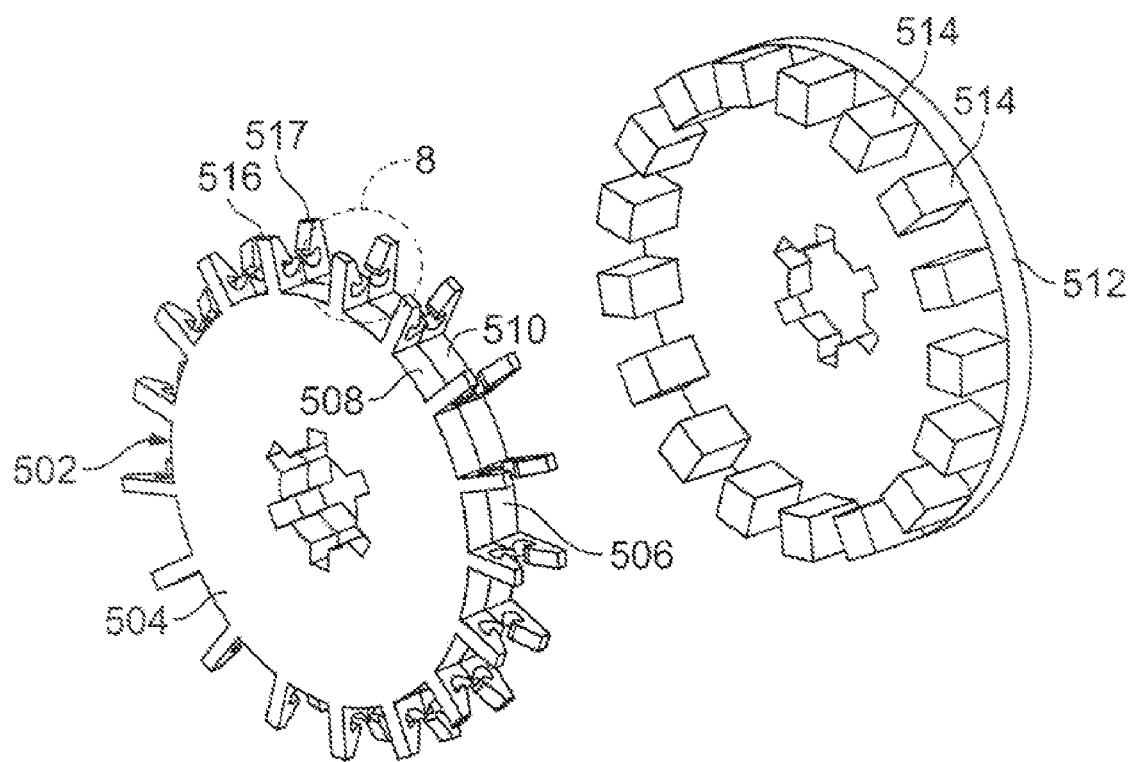
FIG. 7 is a partial exploded view of a molding device that can be used to mold palm-tree-shaped fastener elements.
Figure 8:
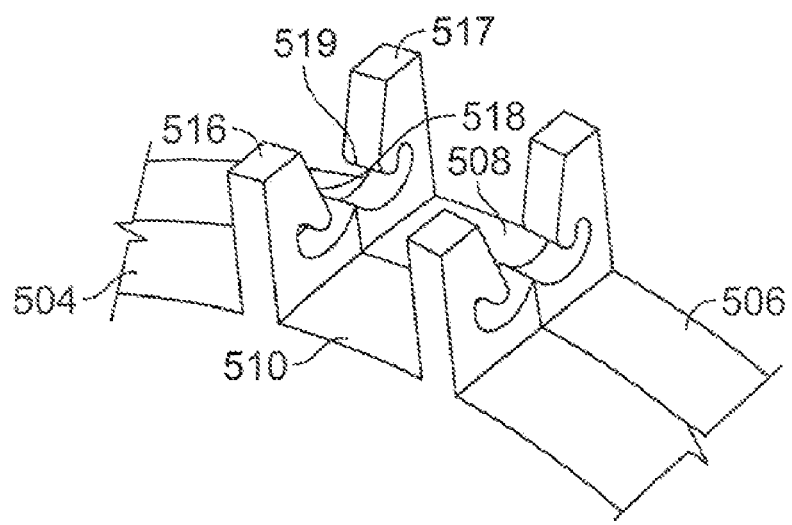
FIG. 8 is an enlarged view of region 8 in FIG. 7.

As shown in FIGS. 7 and 8, a female ring assembly 502 includes two female rings 504 and 506 that define voids 508 and 510, respectively. Female rings 504 and 506 are similar to female ring 102. For example, each of rings 504 and 506 include voids 508 and 510 extending radially inward from peripheral surfaces of the rings and circumferentially spaced apart portions 516 and 517 that are disposed between and define voids 508 and 510. Portions 516 and 517 include recessed regions 518 and 519, which partially define molding cavities. Rings 504 and 506 can be positioned adjacent one another, as shown in FIG. 8, so that recessed regions 518 and 519 of the adjacent rings are aligned with one another to partially define a palm tree shaped molding cavity. An adjacent male ring 512, as shown in FIG. 7, includes inserts 514 extending from its side surface. Upon positioning inserts 514 of male ring 512 within voids 508 and 510, inserts 514 cooperate with portions 516 and 517 of rings 504 and 506 to completely define the palm tree shaped molding cavities. Multiple male and female rings can be stacked together to form a mold roll similar to the mold rolls described above. The resulting mold roll can be used to form molded products in a manner similar to the processes described above.

Figure 9:
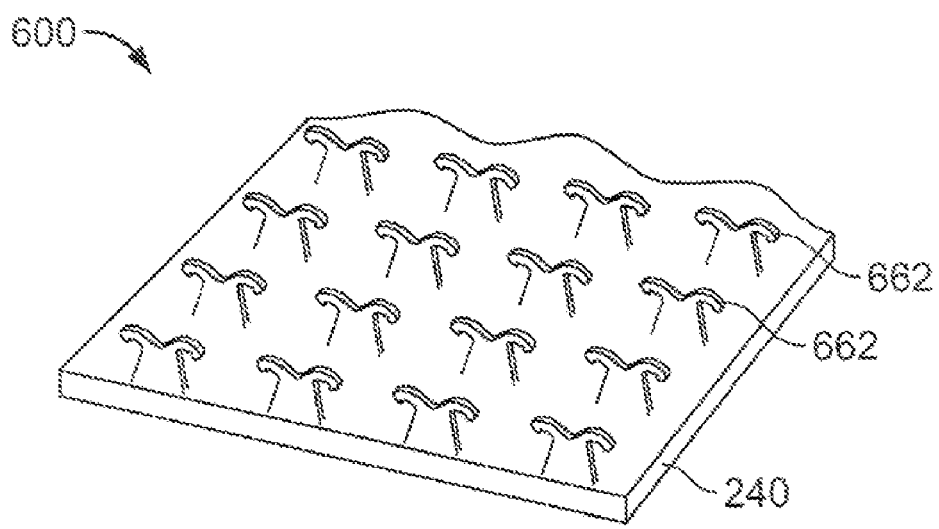
FIG. 9 is a perspective view of a fastener product molded using the molding device of FIG. 7.

FIG. 9 shows a fastener product 600 that can be formed using the above-described mold roll. Fastener product 600 includes multiple rows of palm tree shaped fastener elements 662 extending from resin base 240. The crook portions of the fastener elements extend substantially in the cross-machine direction. Due to the arrangement, fastener product 600 can provide shear and peel resistance to forces applied in either transverse direction of the fastener product (e.g., from left to right or right to left).

Figure 10:
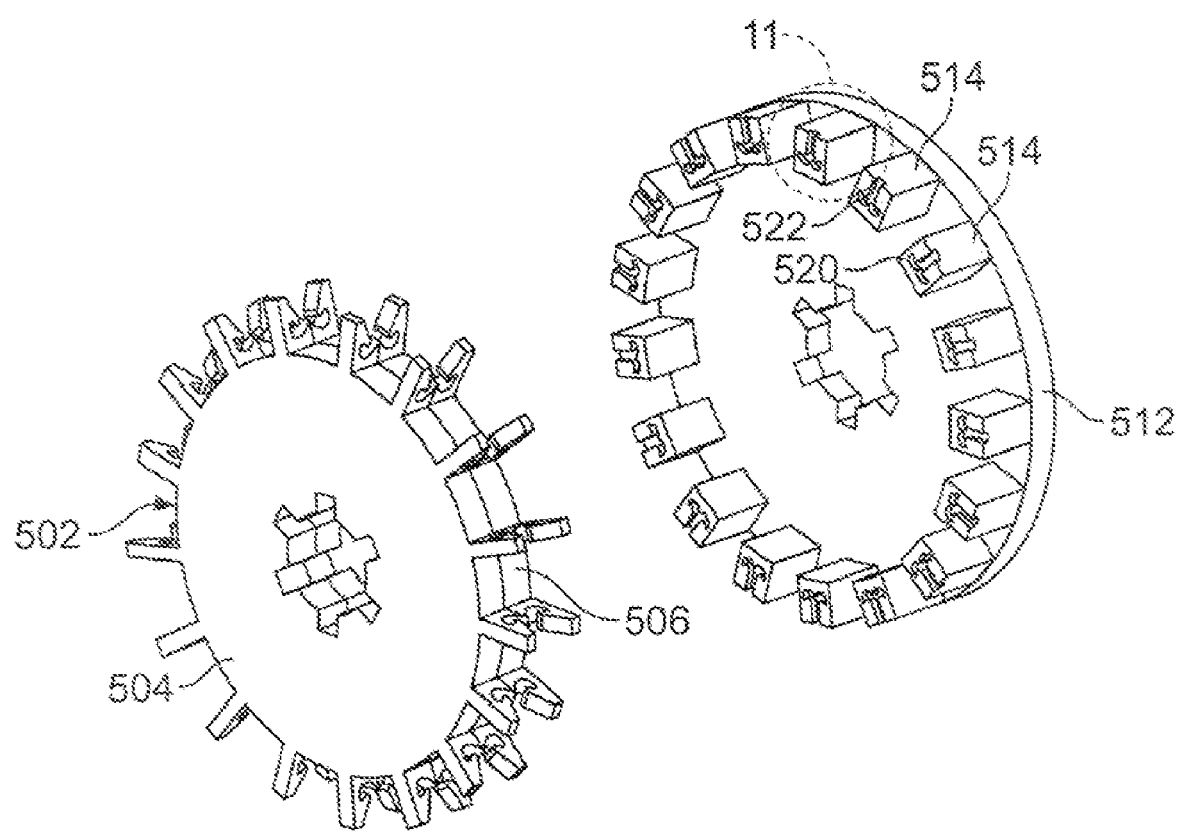
FIG. 10 is a partial exploded view of a molding device that can be used to mold fastener elements extending in both a cross-machine direction and a machine direction.
Figure 11:
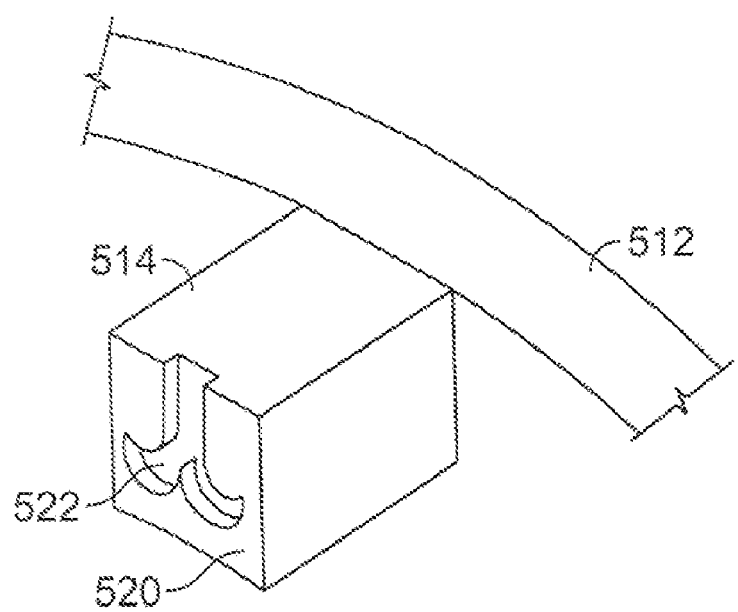
FIG. 11 is an enlarged view of region 11 in FIG. 10.

In some embodiments, the inserts of the male rings include recessed regions that partially define additional molding cavities. As shown in FIGS. 10 and 11, for example, end surfaces 520 of inserts 514 include recessed regions 522 that partially define molding cavities. When inserts 514 are positioned within voids 508 and 510, the recessed region of end surface 520 can abut a side surface of an adjacent ring to completely define the additional molding cavities. For example, a flat side of another male ring 512 (e.g., the side of the male ring opposite the inserts) can abut the end surfaces of inserts 514 to define the molding cavities. Alternatively or additionally, a spacer ring can be positioned adjacent the end surfaces of inserts 514 to define the molding cavities. The spacer ring can, for example, be a ring with substantially flat side surfaces and a circumferential surface that is substantially equal to the circumferential surfaces of the male and female rings (e.g., compression ring 107 in FIG. 1).

Figure 12:
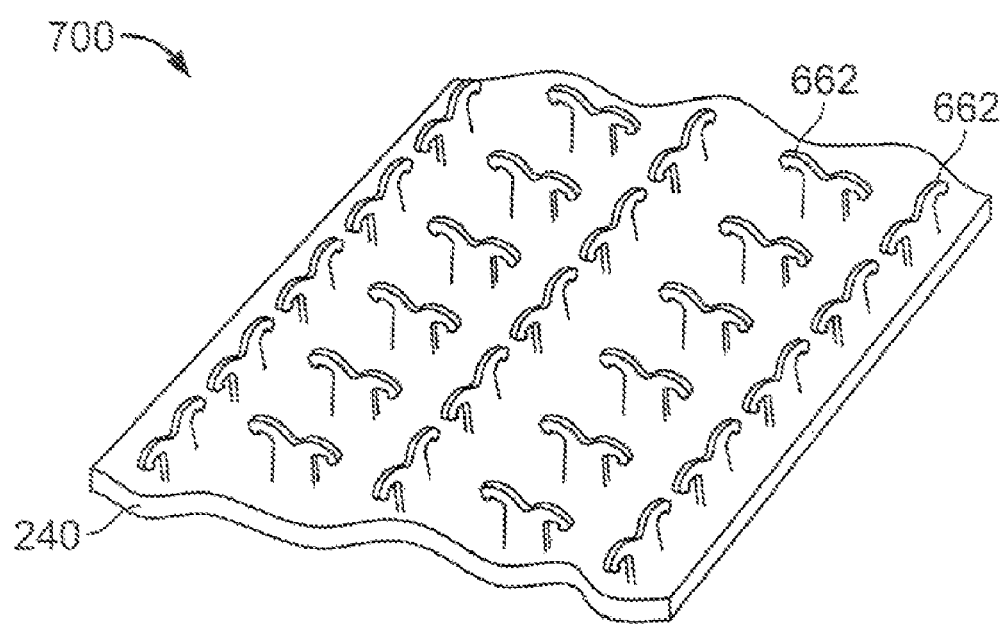
FIG. 12 is a perspective view of a fastener product molded using the molding device of FIG. 10.

The male and female rings can be arranged in a stack to form a mold roll with molding cavities having crook portions extending in the machine direction and cross-machine direction. As shown in FIG. 12, a fastener product 700, which can be formed using the above-described mold roll includes palm tree shaped fastener elements 662 extending from resin base 240. Some of the fastener elements have crook portions extending in the cross-machine direction, while other fastener elements have crook portions extending in the machine direction. As a result, fastener product 700 can provide shear and peel resistance to forces applied both along the machine direction and along the cross-machine direction.

In some embodiments, a ring includes recessed regions in its side wall that partially define molding cavities. For example, the male rings can include recessed portions in their side surfaces opposite the inserts. Alternatively or additionally, spacer rings can be formed with recessed portions in one or both of their side surfaces. The recessed portions of the rings can cooperate with a relatively flat surface of an adjacent ring or a relatively flat surface of a insert to define a molding cavity.

In certain embodiments, the male rings include inserts extending from both side walls. In such embodiments, female rings can be placed on either side of the male rings to define the molding cavities. Spacer rings can be provided between adjacent male rings where sides of inserts include recessed regions that partially define molding cavities.

Figure 13:
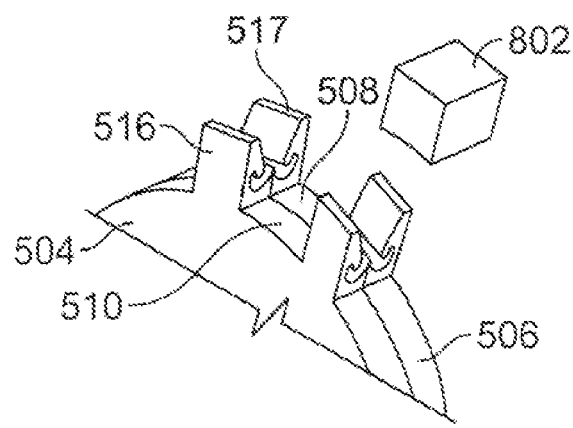
FIG. 13 is a partial exploded view of a molding device including a discrete insert that can be disposed within a void defined by abutted female rings.

While the embodiments described above include inserts extending from a ring, the inserts can alternatively or additionally be discrete members. As shown in FIG. 13, for example, an insert 802 is substantially cubical. Insert 802 can be retained within voids 508 and 510 between members 516 and 517 using press-fitting techniques. Alternatively or additionally, inserts 802 and ring portions 516 and 517 can include mating features that help to secure inserts 802 within voids 508 and 510. Inserts 802 can, for example, include members (e.g., ribs) (not shown) that extend from their side surfaces (e.g., from the surfaces that extend transversely across the rings when inserts 802 are positioned within voids 508 and 510). Ring portions 516 and 517 can include slots (not shown) sized and shaped to receive the ribs of the inserts when the inserts are inserted into the voids via a side surface of the ring. The slots of ring portions 516 and 517 can, for example, extend transversely across the ring. When the ribs of inserts 802 are inserted into the slots of voids 508 and 510, inserts 802 can be prevented from radially escaping from voids 508 and 510. Any of various other retaining techniques can alternatively or additionally be used to help retain inserts 802 within voids 508 and 510. For example, the rings and inserts can be axially compressed and/or adhesive can be used to attach the insert to the rings.

Figure 14:
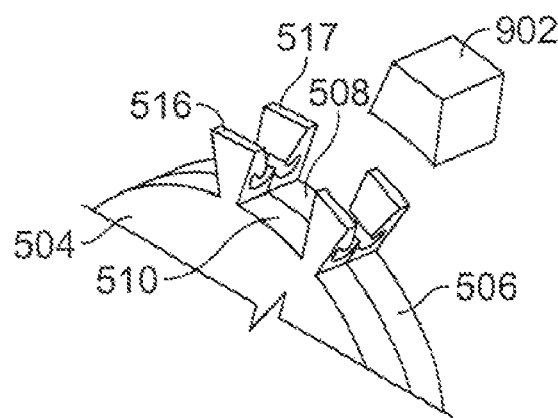
FIG. 14 is a partial exploded view of a molding device including a discrete trapezoidal insert that can be disposed within a void defined by abutted female rings.

In certain embodiments, as shown in FIG. 14, inserts can be trapezoidal. Insert 902, for example, has a bottom region that is greater in width than the upper region (e.g., the region of the insert nearer the circumferential surface of the mold roll). Portions 516 and 517 of rings 504 and 506 can similarly include upper regions that have a greater width than lower regions. Consequently, when inserts 902 are inserted into voids 508 and 510, the angled surfaces of the inserts can contact the angled surfaces of ring portions 516 and 517 to retain the inserts within voids 508 and 510. Alternatively or additionally, inserts 902 may be held in place using any of the various techniques described above.

Figure 15:
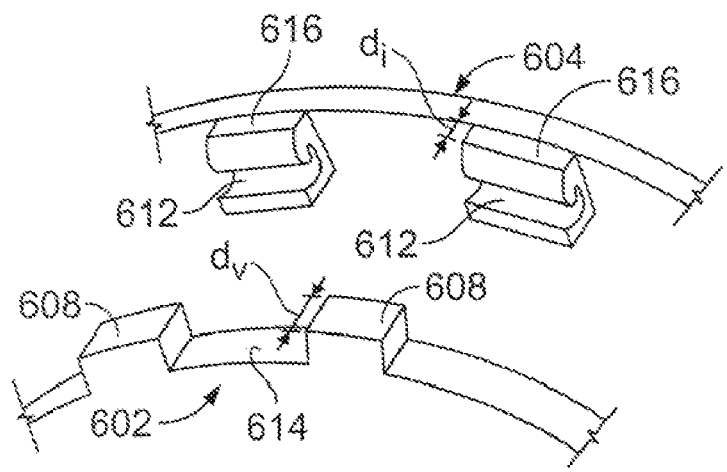
FIG. 15 is a partial exploded view of a molding device including inserts that include recessed regions, which partially define molding cavities.

As a further example, while the female rings of the embodiments above have been described above as having circumferentially spaced apart ring portions including recessed regions that partially define the molding cavities, in certain embodiments, the inserts of the male ring define the recessed regions that partially define the molding cavities. Referring to FIG. 15, for example, a mold roll includes a female ring 602 having multiple voids 614 that extend radially inward from the peripheral surface of female ring 602. Voids 614 are circumferentially spaced apart along the circumferential surface of female ring 602 by ring portions 608 therebetween. A male ring 604 includes multiple inserts 616 extending from its side surface. Inserts 616 include recessed regions 612 that partially define molding cavities. In some embodiments, multiple male and female rings 602 and 604 are stacked in an alternating pattern (e.g., stacked about a mandrel) to form a mold roll. In such embodiments, inserts 616 of male ring 604 are positioned within voids 614 of female ring 602. Insets 616 cooperate with ring portions 608 of female rings 602 and a side wall of an adjacent male ring to define the molding cavities of the mold roll. Alternatively or additionally, rings 602 and 604 can be configured using any of the various techniques described above to form the mold roll and molding cavities.

Voids 614 and inserts 616 can have substantially equivalent heights such that rings 602 and 604 form an even peripheral surface of the mold roll. Voids 614 can have a depth $d_v$ that is greater than a depth $d_i$ of an upper portion of inserts 616. In some embodiments, the depth $d_v$ of void 614 is about twice the depth $d_i$ of the upper portion of inserts 616. Consequently, when multiple rings are stacked and inserts 616 are positioned within voids 614, resin can pass from the peripheral surface of the rings into recessed portions 612 to form the fastener elements. Inserts 616 and voids 614 can also be sized and configured so that resin is substantially prevented from entering spaces between abutted surfaces (e.g., side surfaces) of inserts 616 and ring portions 608 during the molding process. Inserts 616 can, for example, be positioned within voids 614 with tolerances within the range discussed above with respect to inserts 116 and voids 114.

As shown in FIG. 15, recessed regions 612 can be shaped to mold hook-shaped fastener elements. Alternatively or additionally, recessed regions 612 can be shaped to form any of various other types of fastener elements, such as palm tree-shaped elements, mushroom-shaped elements, and stems. In some embodiments, multiple plugs (e.g., two, three, or four or more plugs) can be inserted into each of the voids of the female ring. Each of the plugs can include recessed regions that, when the plugs are inserted within the voids, cooperate with recessed regions of the other plugs to define molding cavities. This can help to define molding cavities including crook portions that extend in multiple different directions. In certain embodiments, for example, plugs 616 can be inserted into voids 614 from both sides of female ring 602 such that recessed regions 612 of each of the plugs align and cooperate to define palm tree-shaped molding cavities.

Any of the various techniques described above with respect to inserts 116 can be used to form inserts 616. In some embodiments, material is removed from all regions of a side surface of a ring having a substantially uniform thickness except those regions in which inserts are desired. As a result, a ring having inserts integrally extending from its side surface can be produced. Alternatively or additionally, material can be applied to a ring of substantially uniform thickness to form inserts extending from a side surface of the ring. Material can be selectively removed from the inserts to form recessed regions 612. Recessed regions 612 can be formed using any of various material removal techniques, such as wire EDM, plunge EDM, micro machining, laser cutting, photo etching, and/or chemical etching. Examples of etching techniques are described in U.S. patent application Ser. No. 10/837,090, filed Apr. 30, 2004, and entitled "Etch Rate Control," which is incorporated by reference herein. Alternatively or additionally, recessed regions 612 can be formed by selectively applying material to inserts 616. Electroplating techniques can, for example, be used to apply material to desired regions of inserts 616 to form recessed regions 612. The material can be removed from and/or added to inserts 616 to form recessed regions of any desired shape.

Figure 16:
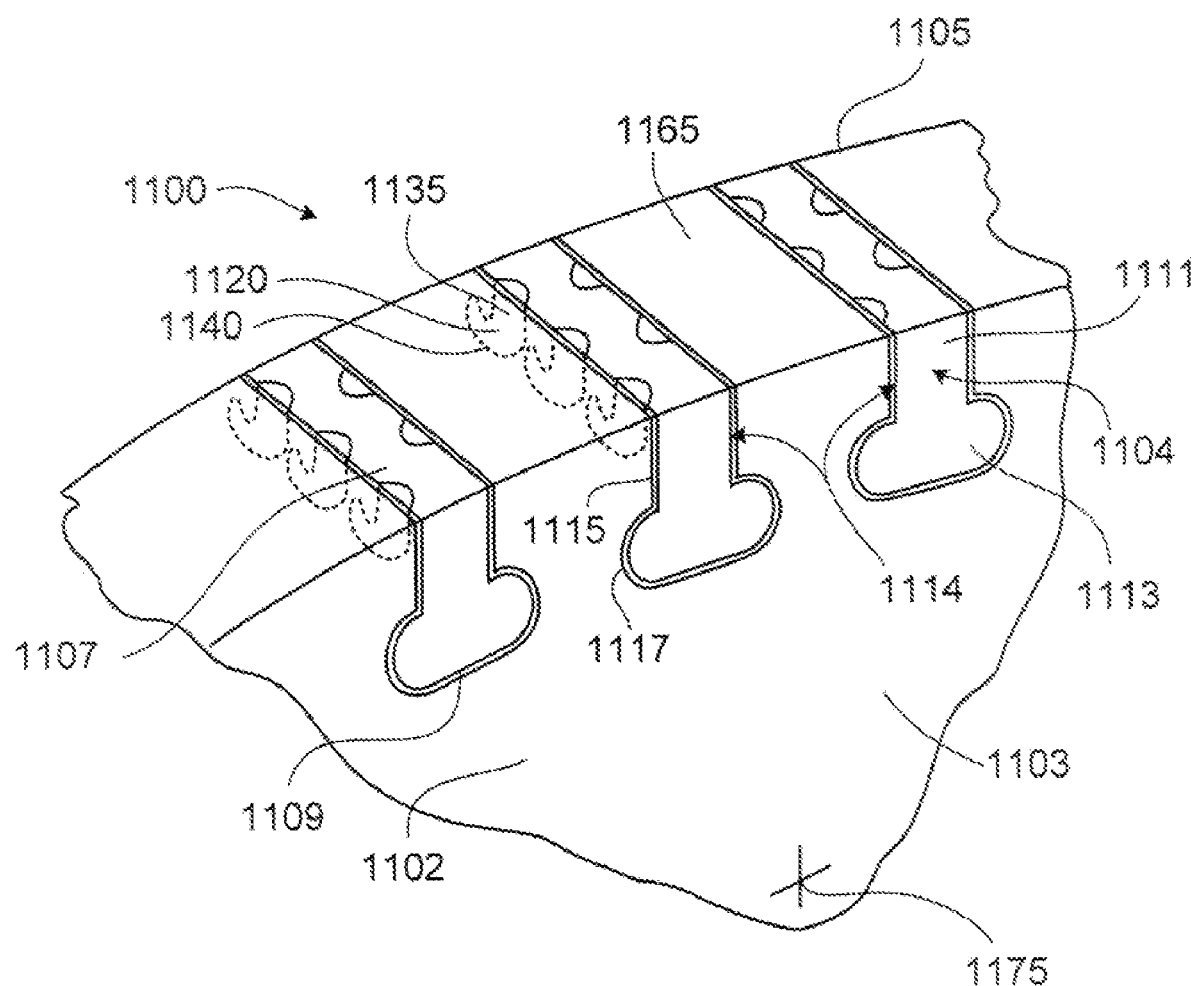
FIG. 16 is a partial perspective view of a molding device defining laterally extending voids with discrete inserts disposed therein.

In some embodiments, multiple molding cavities can be formed along the transverse direction of each insert and a single cylindrical member. As shown in FIG. 16, for example, a mold roll 1100 includes a disk 1102 with voids 1114 that extend from one side 1103 of disk 1102 to an opposite side 1105 of disk 1102. Voids 1114 can be narrow relative to the circumference of disk 1102. For example, voids 1114 can have a width of about 0.01 inch to about 0.025 inch.

Still referring to FIG. 16, inserts 1104 are retained within voids 1114 of disk 1102 such that multiple molding cavities 1120 are defined between inserts 1104 and the surface of disk 1102 that form voids 1114. One end 1107 of each insert is directed toward a peripheral surface 1165 of disk 1102 and substantially aligned with peripheral surface 1165. This can help to form a smooth upper surface of a base of a fastener product molded using mold roll 1100 (e.g., base 240 of fastener product 300 shown in FIGS. 4 and 6). Another end 1109 of each insert 1104 is directed toward an axis of rotation 1175 of disk 1102. Each of inserts 1104 has an upper portion 1111 and an enlarged lower portion 1113. Lower portion 1113 has a greater width than upper portion 1111. Each of voids 1114 of disk 1102 similarly includes an upper portion 1115 and an enlarged lower portion 1117 in which upper portion 1111 and lower portion 1113, respectively, of insert 1104 are received. Due to this arrangement, disk 1102 substantially prevents radial movement of inserts 1104 relative to disk 1102. Inserts 1104 and voids 1114 can have a width of about 0.01 inch and 0.125 inch.

Figure 17:
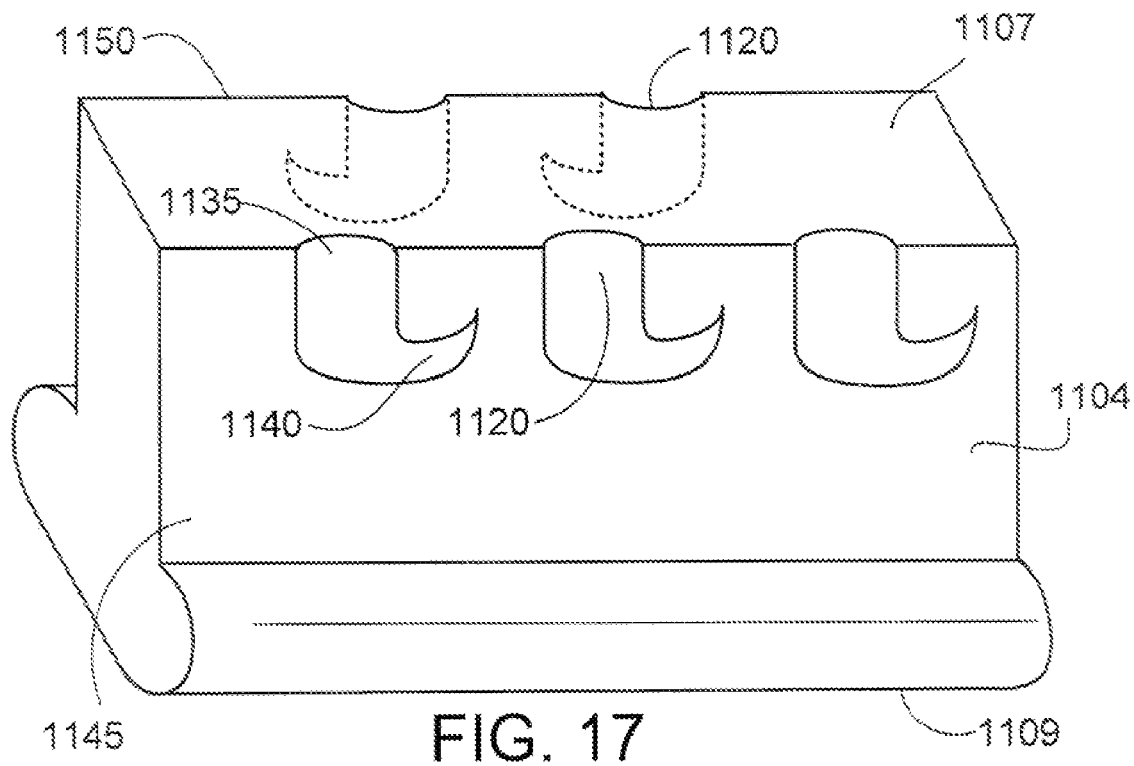
FIG. 17 is a perspective view of an insert with molding cavities partially defined on opposite sides of the insert.

Referring to FIG. 17, in some embodiments, material is removed from each of sides 1145 and 1150 of insert 1104 to partially define cavities 1120 on each of sides 1145 and 1150. Of course, material may alternatively be removed from only one of sides 1145 and 1150 to partially define cavities 1120 on only one side of insert 1104. Additionally or alternatively, as shown in FIG. 18, material may be completely removed between first side 1145 and second side 1150 of insert 1104 to partially define cavities 1120, which extend from first side 1145 completely through to second side 1150.

Figure 18:
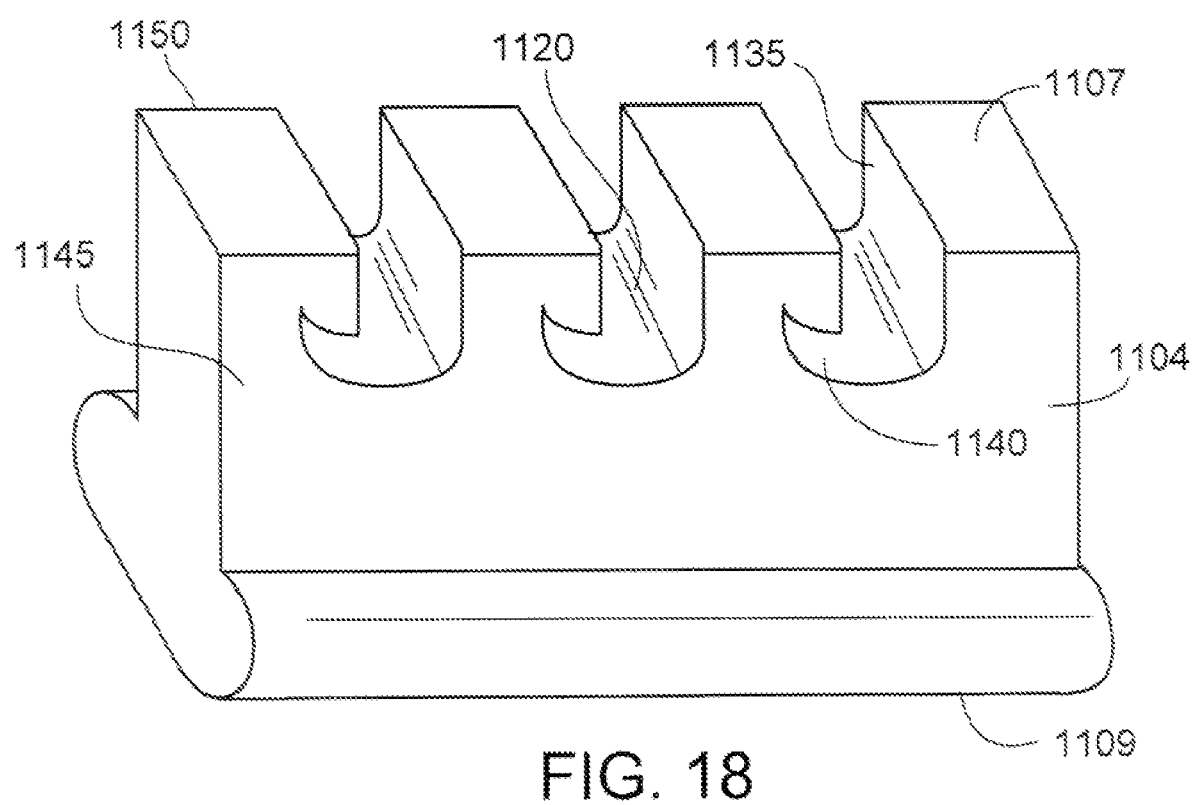
FIG. 18 is a perspective view of an insert defining cavities that extend from one side of the insert to the opposite side of the insert.

As shown in FIGS. 16-18, each of cavities 1120 includes a stem portion 1135 and a crook portion 1140. Fastener elements having corresponding stems and crooks may be produced when molten resin is introduced into cavities 1120, allowed to harden, and then removed. While cavities 1120 are shown as including stem portions 1135 and crook portions 1140, the cavities can alternatively or additionally have different shapes. For example, cavities 1120 can be shaped to produce fastener stems only, palm-tree-shaped fastener elements, or mushroom-shaped fastener elements.

Figure 19:
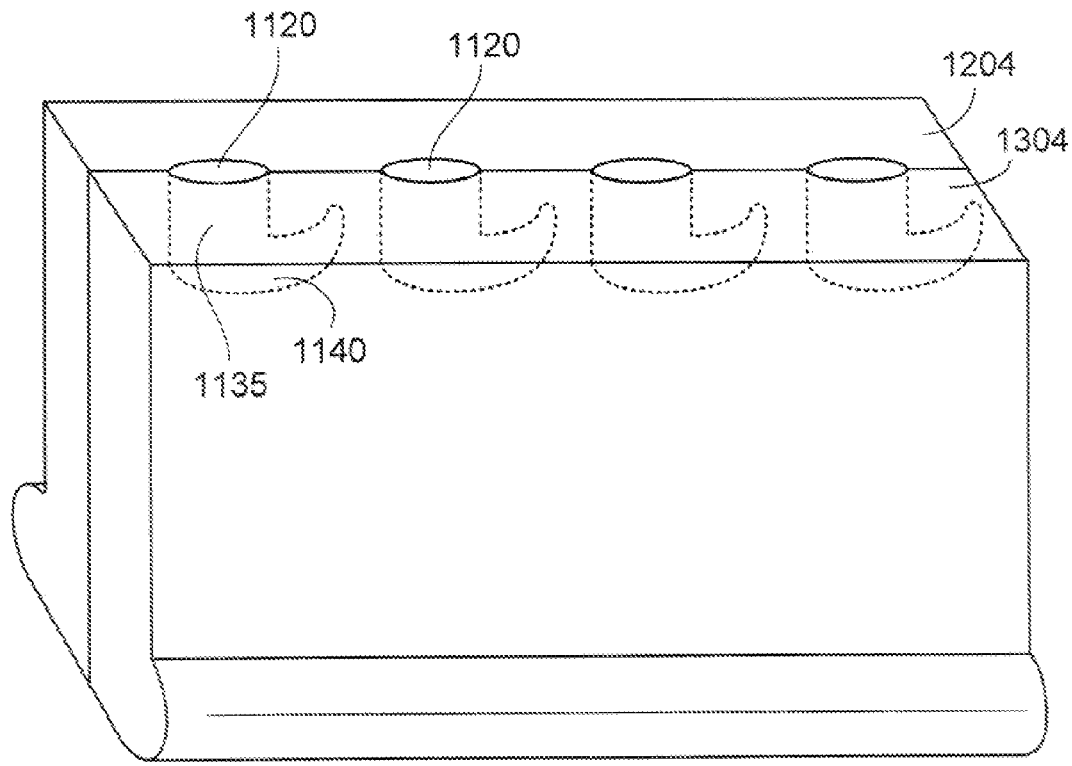
FIG. 19 is a perspective view of an insert that includes multiple, cooperating components that define molding cavities therebetween.

While certain embodiments describe above include a single insert arranged within each void of the disk to form molding cavities, multiple inserts (e.g., two, three, four or more inserts) can be inserted into each of the voids. Each of the inserts can include recessed regions that, when the inserts are inserted within the voids, cooperate within recessed regions of other inserts to define molding cavities. Referring to FIG. 19, for example, a first insert 1204 and a second insert 1304 may be inserted into void 1114 of disk 1102 (shown in FIG. 16) to form molding cavities 1120. Material may be removed from an inner surface of one or both of first and second inserts 1204, 1304 to provide a completely defined cavity when both inserts are inserted into void 1114.

Figure 20:
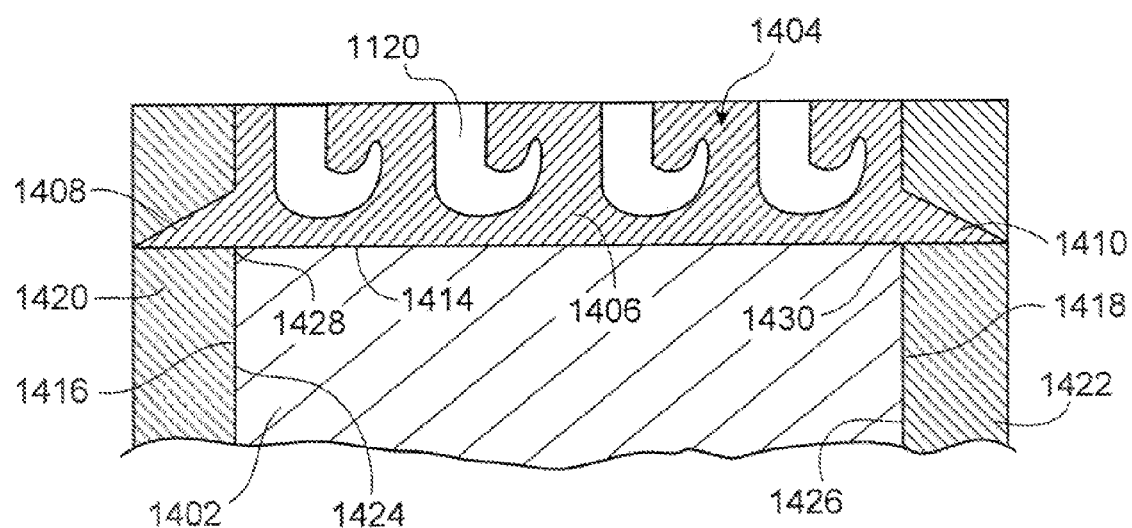
FIG. 20 is a cross-sectional view of an assembled molding device with an insert retained within a void by end caps of the molding device.

While certain embodiments above include inserts that have enlarged lower portions that are used to help retain the inserts within the voids of the disk, other techniques can alternatively or additionally be used to retain the inserts within the voids of the disk. For example, the inserts can have a substantially uniform width along its height and can be press-fitted within the voids. As another example, in certain embodiments, end rings (e.g., retaining caps) are coupled to opposite ends of the disk to retain inserts within voids of the disk. For example, as shown in FIG. 20, an insert 1404 includes a main body potion 1406 and lateral extension portions 1048, 1410 that extend laterally from main body portion 1406. As shown in FIG. 20, when insert 1404 is disposed within a void 1414 of a disk 1402, lateral extension portion 1408 of insert 1404 protrudes transversely beyond a lateral side 1416 of disk 1402 and lateral extension portion 1410 of insert 1404 protrudes transversely beyond an opposite, lateral side 1418 of disk 1402. End rings 1420 and 1422 can be coupled to lateral sides 1416 and 1418, respectively, of disk 1402. Inner surfaces 1424, 1426 of end caps 1420, 1422 include annular grooves 1428, 1430 to accommodate lateral extension portions 1408, 1410 of insert 1404 to retain insert 1404 radially within void 1414. Annular grooves 1428, 1430, as shown in FIG. 20, can have geometries that mate with geometries of lateral extension portions 1408, 1410 of insert 1404. In these embodiments, when end rings 1420, 1422 are coupled to disk 1402, insert 1404 is secured in both the lateral and radial direction of disk 1402 to form a mold roll.

End rings 1420, 1422 and disk 1402 can be coupled using any of various suitable techniques. For example, disk 1402 and end rings 1420, 1422 may be threaded and screwed together. Alternatively or additionally they may be held in place by a compressive force applied to each of end rings 1420, 1422 and directed toward disk 1402.

Insert 1404 can be removed from void 1414 by uncoupling end rings 1420, 1422 from disk 1402 and either sliding insert 1404 out of void 1414 in a lateral direction or lifting insert 1404 out of void 1414 in an upwards or radial direction. This, for example, allows for easy replacement, repair, and cleaning of inserts 1414.

Figure 21:
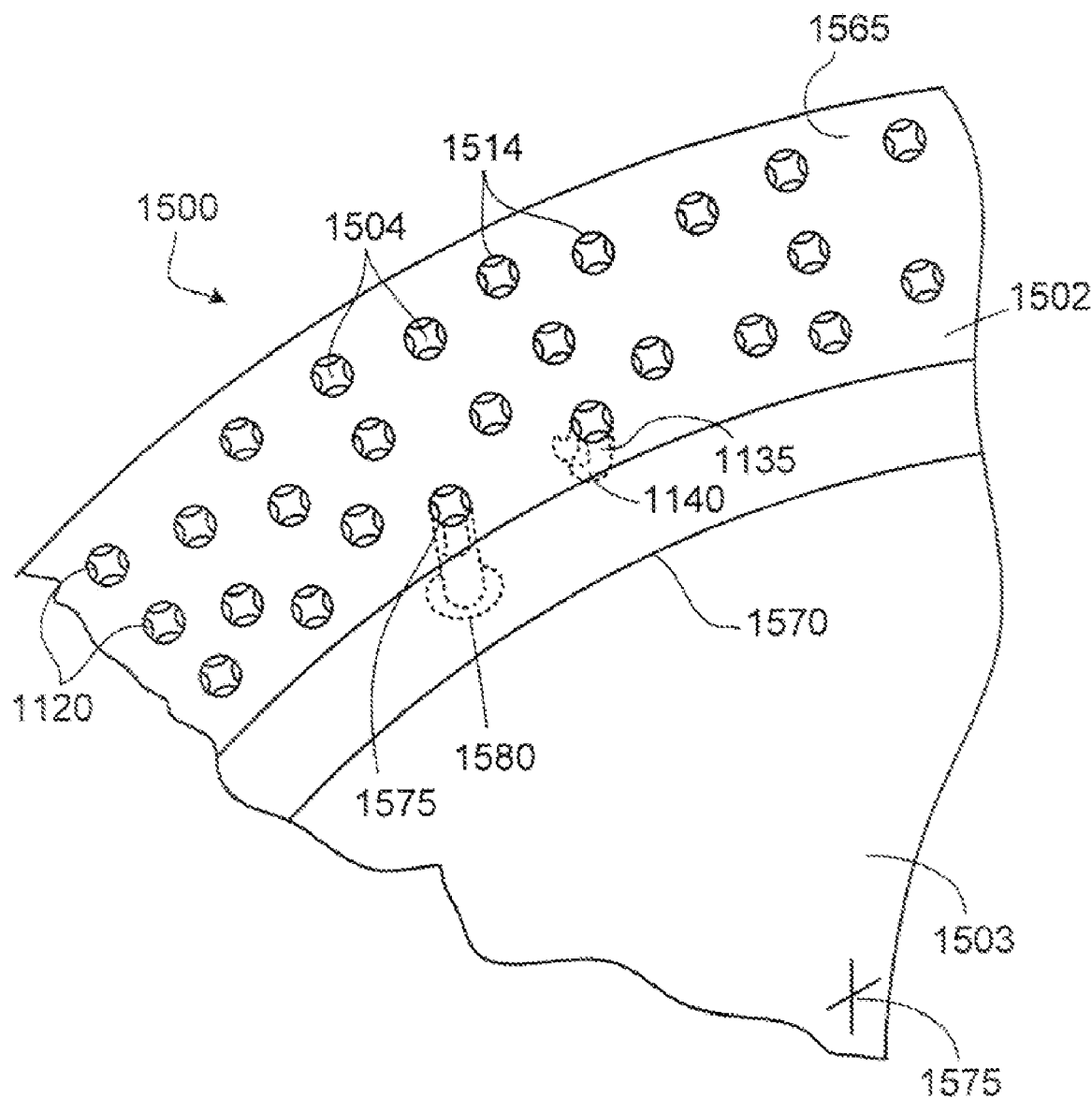
FIG. 21 is a partial perspective view of a molding device including a sleeve defining voids and inserts disposed within the voids.

While certain embodiments describe above include a disk with voids open in its peripheral surface and extending along an axial direction (i.e., along the CMD) of the disk, the disk can additionally or alternatively be formed with voids (e.g., bores) that are open in the peripheral direction and closed along the axial direction of the ring. For example, as shown in FIG. 21, a mold roll 1500 includes a sleeve 1502 arranged about a mandrel 1503. Sleeve 1502 defines an array of voids 1514 extending radially inward from a peripheral surface 1565 to an inner surface 1570 of sleeve 1502. Voids 1514 can be of various shapes and sizes corresponding to the shapes and sizes of inserts 1504 that are inserted and retained within voids 1514. Voids 1514 may be created using, drilling, etching, or EDM techniques. In some embodiments, voids 1514 are particularly small in diameter. For example, voids 1514 can have a diameter of about 0.05 inch to about 0.25 inch. Similarly, inserts 1504 can have a diameter of between about 0.05 inch and about 0.25 inch.

Figure 22:
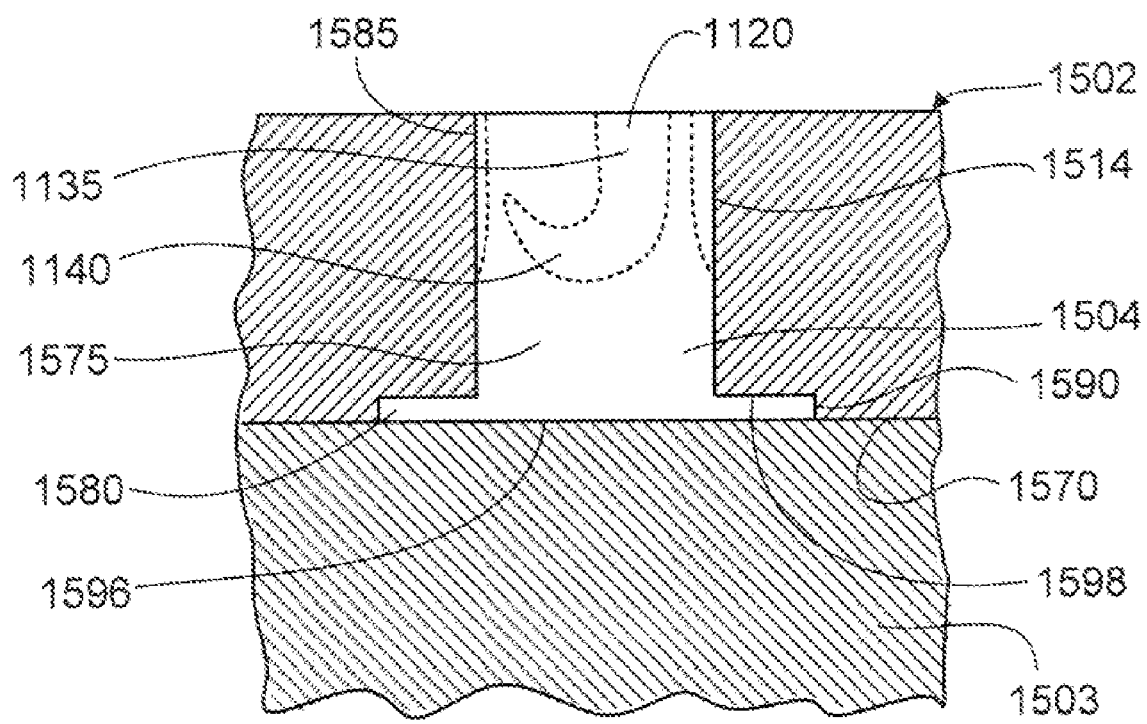
FIG. 22 is a cross-sectional view of an insert disposed in a void of the molding device of FIG. 21.

Several suitable methods can be used to retain inserts 1504 within voids 1514 defined by sleeve 1502. For example, as shown in FIG. 22, insert 1504 includes a cylindrical shank 1575 with a flange 1580 at one end. Void 1514 of sleeve 1502 includes a central portion 1585 and a recessed portion 1590. Central and recessed portions 1585, 1590 of void 1514 conform with shank 1575 and flange 1580, respectively, of insert 1504. Insert 1504 may be inserted into void 1514 from the direction of inner surface 1570 of sleeve 1502 such that shank 1575 of insert 1504 sits within central portion 1585 of void 1514 and flange 1580 of insert 1504 sits within recessed portion 1590 of void 1514. Sleeve 1502 can be disposed around mandrel 1503 such that mandrel 1503 abuts a bottom surface 1596 of insert 1504, while flange 1580 of insert 1504 abuts a recessed inner surface 1598 of sleeve 1502. In these embodiments, insert 1504 is firmly compressed between mandrel 1503 and sleeve 1502, and thereby retained within void 1514.

Figure 23:
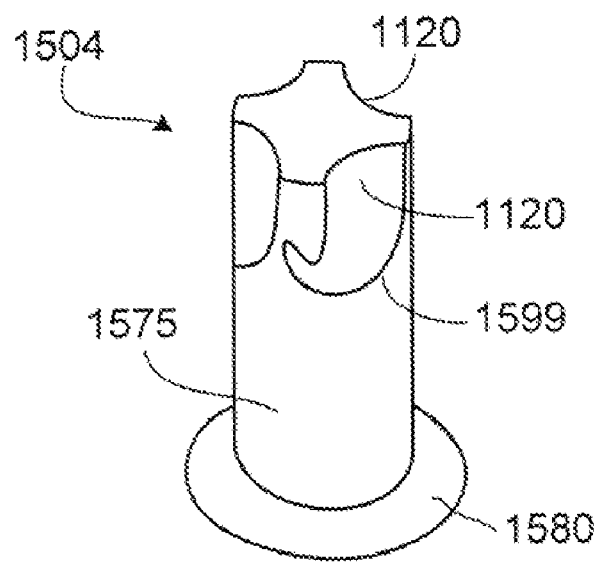
FIG. 23 is a perspective view of one of the inserts illustrated in FIG. 21.
Figure 24:
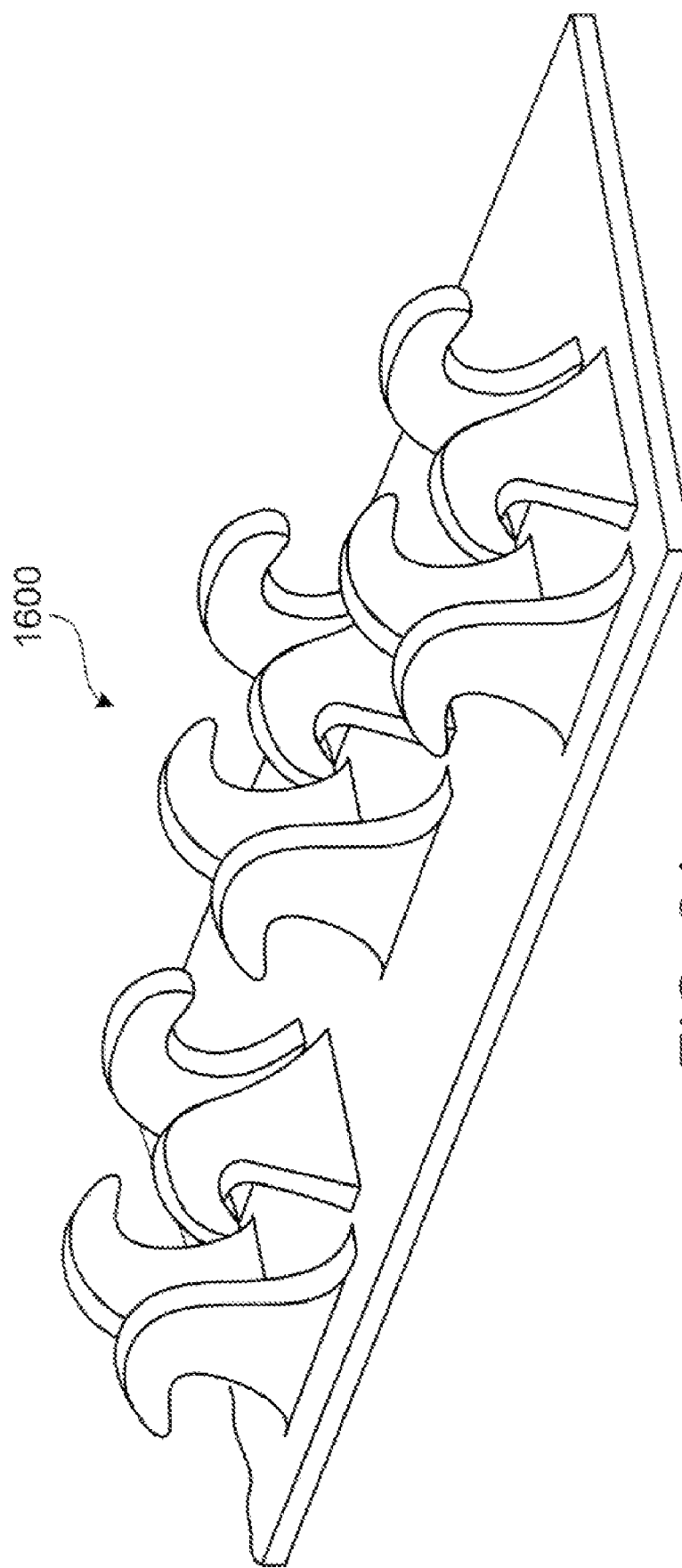
FIG. 24 is a partial perspective view of a fastener product molded using the molding device of FIG. 21.

Inserts 1504 can be configured and arranged to create several orientations of molding cavities 1120 when inserts 1504 are disposed within voids 1514 of sleeve 1502. For example, as shown in FIG. 23, multiple molding cavities 1120 are arranged along a perimeter surface 1599 of insert 1504. All cavities 1120 can face in the same direction (e.g., clockwise or counter-clockwise) about insert 1504, as viewed from the mold roll surface. This can enable the molding of a group of fastener elements having crooks oriented in different directions. As a result, fastener product 1600 (shown in FIG. 24), which provides substantially equal peel and shear resistance in multiple directions, can be produced using mold roll 1500. Referring again to FIG. 23, as the number of cavities facing in any one direction increases, the amount of peel and shear resistance in that direction also increases.

In these embodiments, inserts 1504 may be secured in corresponding voids 1514 of sleeve 1502 in any rotational orientation. As a result, molding cavities 1120 may be oriented in any direction relative to the machine direction of processing. Thus, fastener elements oriented in various directions with respect to a fastener product base can advantageously be produced.

While the insert shown in FIG. 23, includes four molding cavities 1120 that are substantially equally spaced about the circumference of the insert, it should be appreciated that the insert may include more than four molding cavities (e.g., six molding cavities or more). As the number of molding cavities per insert increases, the number of directions in which the resulting product provides peel and sheer resistance can also increase. The following are incorporated by reference herein in their entirety: U.S. Pat. No. 4,794,028 issued to Fisher; U.S. Pat. No. 5,971,738 issued to Jens et al.; and U.S. Pat. No. 6,202,260 issued to Clune et al.

While many embodiments described herein include molding cavities that are shaped to form fastener elements, such as hooks, that can engage corresponding fastener products, the molding cavities can alternatively or additionally be shaped to form any of various types of molded elements.

Other embodiments are in the claims.

What is claimed is:

1. A molding apparatus, comprising:
    a cylindrical member defining a void extending radially inward from a peripheral surface of the cylindrical member; and
    an insert configured to be disposed within the void, the insert and the cylindrical member cooperating to define a molding cavity when the insert is disposed within the void, the molding cavity being shaped to mold, from molten resin introduced into the molding cavity, a fastener element including a stem and a feature extending radially from the stem in at least one direction for releasable engagement with a mating fastener product.

2. The apparatus of claim 1, wherein the molding cavity is shaped to mold a fastener element having a crook portion.

3. The apparatus of claim 1, wherein the insert can be oriented in the void to mold a fastener element having a crook portion that extends in a direction across a width of the cylindrical member.

4. The apparatus of claim 1, wherein the insert is configured to be positioned within the void in any of a plurality of orientations.

5. The apparatus of claim 1, wherein the insert is removable from the void.

6. The apparatus of claim 1, wherein the insert and the void have mating geometries.

7. The apparatus of claim 1, wherein the insert extends from a surface of a ring, the insert being disposed within the void when the ring is positioned adjacent and concentric with the cylindrical member.

8. The apparatus of claim 7, wherein the molding apparatus comprises multiple such cylindrical members and rings arranged adjacent to one another in an alternating pattern.

9. The apparatus of claim 8, wherein the multiple cylindrical members and rings are disposed about an inner member and axially compressed to form a substantially cylindrical mold roll.

10. The apparatus of claim 1, wherein the molding cavity extends from a first side of the insert to a second side of the insert.

11. The apparatus of claim 1, wherein the cylindrical member comprises a sleeve having an inner surface, the void extending from the inner surface to the peripheral surface of the sleeve.

12. The apparatus of claim 1, wherein the cylindrical member defines a plurality of circumferentially spaced apart voids, a plurality of inserts being configured to be disposed within the voids.

13. A molding apparatus, comprising:
    a cylindrical member defining a void extending radially inward from a peripheral surface of the cylindrical member; and
    an insert configured to be disposed within the void, the insert and the cylindrical member cooperating to define a molding cavity when the insert is disposed within the void, the molding cavity being shaped to mold an element from molten resin introduced into the molding cavity, wherein the insert can be oriented in the void such that a portion of the element overhanging a base of a product molded by the molding apparatus extends in a direction across a width of the cylindrical member.

14. The apparatus of claim 13, wherein the insert and the void have mating geometries.

15. The apparatus of claim 14, wherein the insert is press-fined within the void.

16. The apparatus of claim 13, wherein the void extends along the circumferential surface of the cylindrical member in a direction substantially parallel to the axis of rotation of the cylindrical member.

17. The apparatus of claim 16, wherein the void extends from a first side of the cylindrical member to a second side of the cylindrical member.

18. The apparatus of claim 13, wherein a portion of the cylindrical member defining the void comprises a recess that, together with the insert, defines the molding cavity.

19. The apparatus of claim 18, wherein the recessed portion of the cylindrical member defining the void, together with a recessed portion of the insert, defines the molding cavity.

20. The apparatus of claim 13, wherein a first molding cavity is defined between a first side of the insert and the cylindrical member.

21. The apparatus of claim 20, wherein a second molding cavity is defined between a second side of the insert and the cylindrical member.

22. The apparatus of claim 13, wherein the insert extends from a surface of a ring, the insert being disposed within the void when the ring is positioned adjacent and concentric with the cylindrical member.

23. The apparatus of claim 22, comprising multiple such cylindrical members and rings arranged adjacent to one another in an alternating pattern.

24. The apparatus of claim 23, wherein the multiple cylindrical members and rings are positioned about an inner member and axially compressed to form a substantially cylindrical mold roll.

25. The apparatus of claim 13, wherein the molding cavity extends from a first side of the insert to a second side of the insert.

26. The apparatus of claim 13, wherein the cylindrical member comprises a sleeve having an inner surface, the void extending from the inner surface to the peripheral surface of the sleeve.

27. The apparatus of claim 13, wherein the insert is configured to be positioned within the void in any of a plurality of orientations.

28. A molding device, comprising:
a cylindrical member defining a void extending radially inward from a peripheral surface of the cylindrical member;
an insert disposed within the void of the cylindrical member, the insert comprising a body portion and at least one laterally extending portion that extends laterally from the body portion; and
an end cap coupled to the cylindrical member, the end cap defining a groove extending laterally from a side surface of the end cap and receiving the laterally extending portion of the insert such that the insert is restrained within the groove of the end cap.

29. The molding device of claim 28, wherein the cylindrical member defines a plurality of circumferentially spaced apart voids extending radially inward from the peripheral surface of the cylindrical member and a plurality of inserts disposed within the plurality of voids.

30. The molding device of claim 28, wherein the insert and the cylindrical member cooperate to define at least one molding cavity.

31. The molding device of claim 30 wherein the at least one molding cavity comprises a crook portion that extends in a lateral direction across the cylindrical member.

32. The molding device of claim 28, wherein the groove is an annular groove.

33. The molding device of claim 28, wherein the laterally extending portion of the insert is tapered.

34. The molding device of claim 28 wherein the laterally extending portion of the insert and the groove have mating geometries.

* * * * *

UNITED STATES PATENT AND TRADEMARK OFFICE
CERTIFICATE OF CORRECTION

PATENT NO. : 7,641,469 B2 Page 1 of 1
APPLICATION NO. : 11/740097
DATED : January 5, 2010
INVENTOR(S) : William P. Clune et al.

It is certified that error appears in the above-identified patent and that said Letters Patent is hereby corrected as shown below:

On the title page item (75), (Inventors), line 1:
        delete "Hillsboro" and replace with --Hillsborough--.

Claim 15, column 17, line 11:
        delete "fined" and replace with --fitted--.

Signed and Sealed this

Twenty-third Day of February, 2010

David J. Kappos
*Director of the United States Patent and Trademark Office*